United States Patent [19]

Fritz et al.

[11] 4,170,088
[45] Oct. 9, 1979

[54] PLANT SUPPORT STAKE

[75] Inventors: Brian E. Fritz, 1159 Hymettus, Leucadia, Calif. 92024; Emil Pipersky, Chino, Calif.

[73] Assignee: Brian E. Fritz, Leucadia, Calif.

[21] Appl. No.: 579,823

[22] Filed: May 22, 1975

[51] Int. Cl.² .................................................. A01G 27/00
[52] U.S. Cl. ................................................ 47/47; 47/70
[58] Field of Search ................... 47/47, 39, 1.2, 58, 47/70

[56]         References Cited
        U.S. PATENT DOCUMENTS 3,188,771  6/1965  Ballai ........................................ 47/47
3,608,238  9/1971  Reuter ....................................... 47/1.2
3,740,024  6/1973  Hellerich et al. ....................... 256/51
3,988,858  11/1976 Bomba ....................................... 47/58

FOREIGN PATENT DOCUMENTS 2247967  5/1975  France ........................................ 47/46
1294269  10/1972 United Kingdom ....................... 47/47

Primary Examiner—Edgar S. Burr
Assistant Examiner—James R. Feyrer
Attorney, Agent, or Firm—Brown & Martin

[57]                ABSTRACT

The stake incorporates a foamed plastic core. The core is covered by brown paint. A layer of peat moss is adhesively secured over the painted layer and is uniformly distributed over the surface of the stake.

5 Claims, 3 Drawing Figures

PLANT SUPPORT STAKE

BACKGROUND OF THE INVENTION

Plant stakes have been utilized to support climbing varieties and other plants that can be restrained to a vertical support. In one common installation an elongated piece of bark is inserted into the earth surrounding a potted plant. The plant is then tied or otherwise brought into contact with the surface of the bark. In time, the plant attaches itself to the bark and the restraints may be removed. Bark supports have a surface that is conductive to the attachment of the climbing roots from the plant, but have several disadvantages in use. The bark is subject to rotting especially at the surface of the normally moist soil. Also, the porous interior of the bark may contain undesirable foreign substances, insects, and plant diseases that may contaminate the soil and damage the plant. Furthermore, it is difficult to obtain uniform and attractive bark, especially in large quantities, and the bark, as with other wood products, has become increasingly expensive. The noted deficiencies of bark plant supports are generally applicable to other plant supports of natural materials such as wooden plant support holes.

The limitations of plant supports from natural materials have led to the development of various plant supports utilizing man-made materials. Plastic plant supports have been developed. Plastic materials do not deteriorate by rotting, but cannot easily accommodate the requirement for initial plant restraint or provide a surface to which the plant can adhere. To overcome these deficiencies, elaborate molded, or otherwise formed patterns have been formed into the plastic molded parts. The holes or other aperatures in a plastic plant support increase the cost of the finished product. Furthermore, the holes do not provide a surface on which the plant can secure itself. Typically, such products must provide an interior cavity carrying material to which the plant may adhere. The plant must be trained to grow into the holes in the plastic support and into the interior of the device to secure itself to the material located therein. Such devices are generally not reusable because it is impossible to remove the plant from the support without substantially damaging or destroying it. A further disadvantage of such devices is that the exterior finish of the plastic molded parts is not esthetically desirable, particularly in association with living plants. It is therefore necessary to so arrange the plant, and nurture it until it substantially completely obscures the plastic support, before the combined plant and support become a marketable commodity.

Therefore, it is desirable to have a plant support stake that may be manufactured at a relatively low cost and provide a surface to which a plant can adhere. Such a plant support stake is particularly desirable where it provides for easy initial securing of the plant in position on the stake and presents an attractive overall appearance.

SUMMARY OF THE INVENTION

An exemplary embodiment of the invention incorporates a plant support stake having a resilient foamed plastic core. The core is elongated and may have a square, round or other cross-section. One end of the core is pointed so that it may be easily driven or inserted into loose soil. The resilient plastic foams are light in weight, and inexpensive to manufacture and form. The core is easily penetrated by a tack, pin or other pointed fastener to initially secure the plant in position along the length of the core. The resiliency of of the plastic material frictionally holds the pointed fastener so that they are not easily dislodged. However, the plastic foam has a surface texture and color which is generally undesirable in a plant environment. Therefore, in the practice of the invention, the plastic core is coated with a colorant, such as conventional spray paint. Preferably, a brown shade is utilized. A suitable adhesive is applied over the paint. Before the adhesive drys, fibrous organic material is spread over the surface of the stake and held by the adhesive, thereby providing a uniform layer of fibrous material.

Substantially, any adhesive may be utilized with the invention. However, contact cement has been found to be particularly advantageous in that it forms a relatively thick layer of adhesive and securely holds the fibrous material in place with various application techniques including spraying.

Various organic materials may be utilized to good effect with the practice of the invention including sphagnum moss, wood shreddings and similar materials. However, peat moss has been found to be particularly desirable in the practice of the invention in that it forms a desirable matrix onto which the plant can secure itself and also provides nutrients to the plant through the climbing roots of the plant. Further, peat moss has a desirable appearance when applied in a uniform layer over the brown colorant layer, generally simulating the appearance of natural wood. Peat moss holds moisture and thereby advances the process of the plant securing itself.

It is therefore an object of the invention to provide a new and improved plant support stake that is easily manufactured and relatively low in cost.

It is another object of the invention to provide a new and improved plant support stake that is sterile and does not carry diseases communicable to plants.

It is another object of the invention to provide a new and improved plant support stake that provides for easy and initial attachment and subsequent self-attachment of a plant to the stake.

It is another object of the invention to provide a new and improved plant support stake that presents a uniform and desirable esthetic appearance.

It is another object of the invention to provide a new and improved plant support stake made of manufactured materials not subject to rotting.

It is another object of the invention to provide a new and improved plant support stake that simulates the appearance and function of natural wood or bark.

Other objects and many attendant advantages of the invention will become more apparent upon a reading of the following detailed description together with the drawings in which like reference numerals refer to like parts throughout and in which:

DETAILED DESCRIPTION OF THE DRAWING

Figure 1:
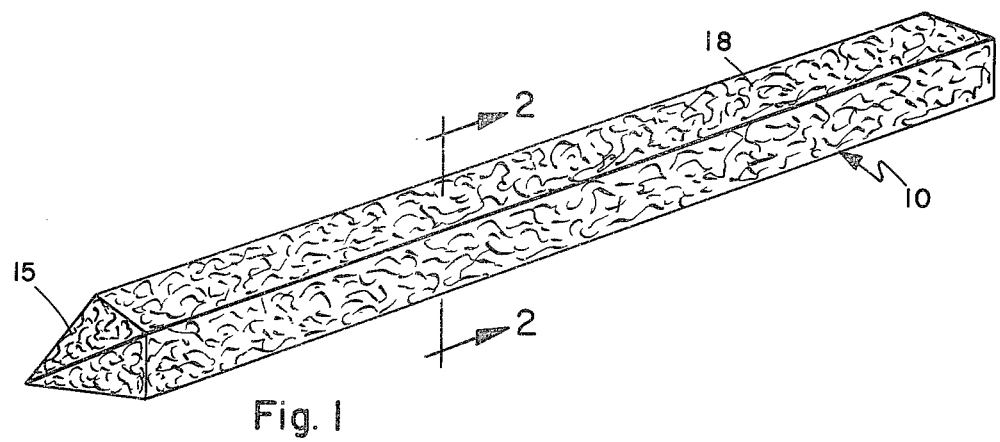
FIG. 1 is a perspective view of the plant support stake.

Referring now to the drawings, there is illustrated the plant support stake 10 according to the invention. The stake comprises an elongated foamed plastic core 12 having a pointed end 15. Any of the generally utilized foamed plastics may be utilized for the core, such as foamed and expanded polystyrene, polypropylene, or polyurethene. Polyurethene has been found to be particularly advantageous with the use of the invention especially due to its higher overall strength and desirable resiliency characteristics. The resiliency of the foam allows it to grasp and retain fasteners driven into the cellular surface. The foamed plastic core 12 is easily formed to the finished shape, such as the rectangular configuration illustrated in the drawings, by any generally accepted forming technique, including molding. A layer of colorant 14, such as conventional brown paint, may be applied by spraying or dipping to produce a uniform overall color and to thereby obscure the undesirable texture and appearance of the foamed core 12. After the colorant layer 14 dries, an adhesive layer 16 is sprayed or otherwise applied over the colorant layer 14. The adhesive may desirably be a relatively thick layer of contact cement. Contact cement holds fibrous chopped peat moss 18 that is blown or otherwise placed on the surface of the stake 10 without any requirement that the moss 18 be held in place until the adhesive 16 dries. The peat moss forms a layer of substantially uniform thickness over the entire outer surface of the stake 10. Small voids or gaps in the peat moss 18 will not substantially effect the overall appearance of the device, due to the effect of the colorant layer 14. The peat moss 18 provides a fibrous surface to which the small climbing roots of the plant can adhere.

Figure 2:
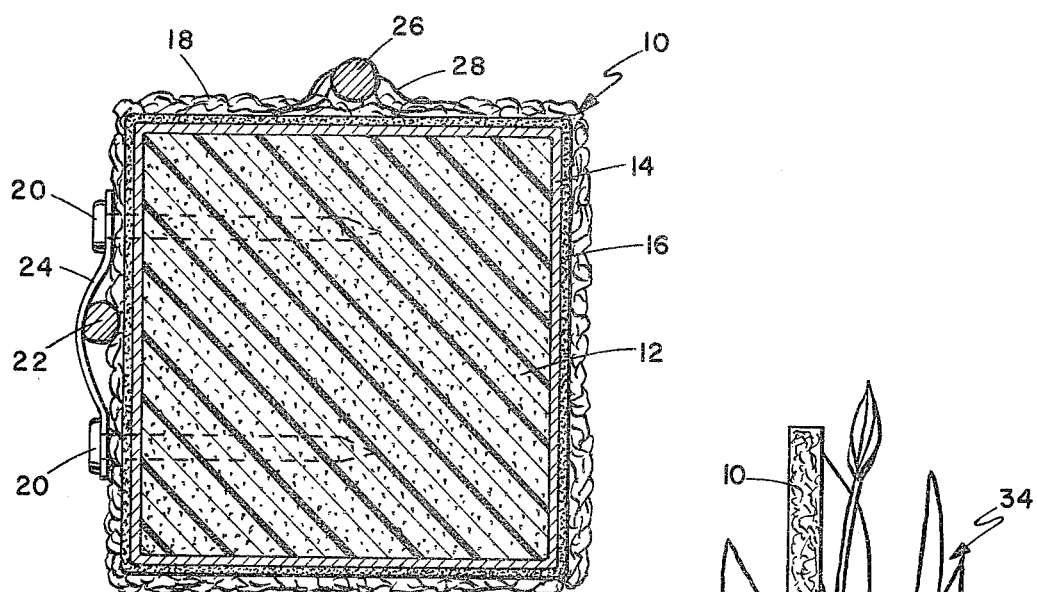
FIG. 2 is a sectional view taken on line 2—2 of FIG. 1.

FIG. 2 illustrates a configuration for securing plants in an initial position on the stake 10. Pointed fasteners 20 are positioned on either side of the plant stem 22, and secure the stem 22 by a strap 24. After the plant has put out climbing roots 28 such as those emanating from stem 26, the fasteners 20 and straps 24 may be removed if desired. The roots 28 develop a strong intertwined relationship with the fibrous matt of peat moss 18. Further, restraint of the plant is not required except for shaping and similar retraining of the plant.

Figure 3:
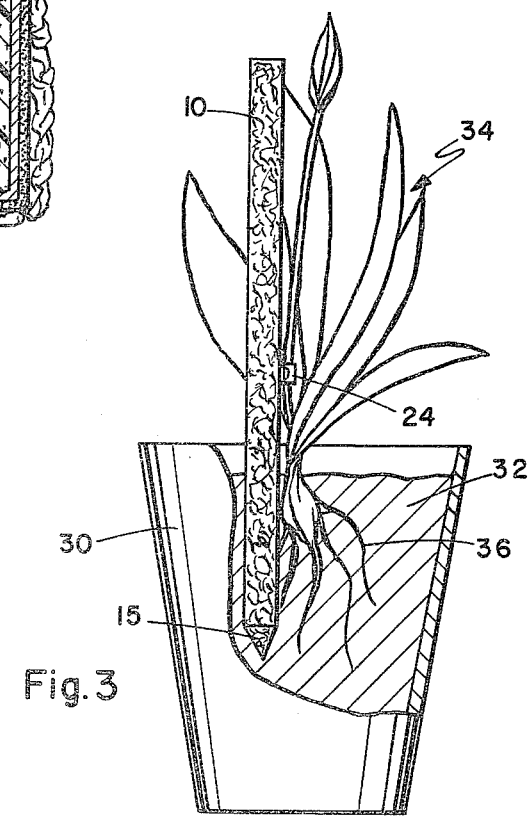
FIG. 3 is a side elevational view showing the plant support stake in association with a potted plant.

FIG. 3 illustrates a pot 30 substantially filled with soil 32. A plant 34 is rooted, by roots 36, into the soil 32 and is secured by climbing roots to the plant stake 10.

In the use of the invention, the stake 10 is driven into soil 32, or placed in the pot 30 prior to the filling of the pot 30 with soil 32. Thereafter, the plant 34 is transplanted into the pot 30 and its upper stems 26 and 22 secured to the stakes by pointed fasteners, such as pins 20. When the plant is subsequently watered, water is applied over the surface of the stake 10. The moss 18 retains some of the water. The moist surface of the moss 18 attracts and nurtures climbing roots, such as the roots 28, thereby encouraging the plant to secure itself to the surface of the stake. If it should subsequently become necessary to remove or to reposition the plant 34, the roots may be withdrawn from the peat moss 18 and repositioned on the stake. The repositioning is accomplished without substantial deterioration of the appearance of the device, because the colorant layer 14 has a complementary appearance to that of the moss 18.

Having described our invention, we now claim:

1. A plant support stake for supporting climbing plants comprising:
   an elongated stake body for being received in soil and for supporting a plant vertically above said soil,
   said stake body having a core consisting entirely of a unitary foamed resilient plastic,
   said resilient foamed plastic core having a cellular structure,
   a fastener comprising two pointed members interconnected by a strap bridging said pointed members, said fastener for being received in, supported from, and retained by said foamed plastic core, and adapted for securing the plant to said stake body,
   fibrous material comprising peat moss secured by adhesive over said stake body in a uniform thickness.

2. The plant support stake of claim 1, further including:
   a colorant layer covering said foamed plastic core.

3. The plant support stake of claim 2 wherein:
   said colorant layer comprises brown paint.

4. The plant support stake of claim 3 wherein: said fibrous material is secured to said colorant layer by adhesive.

5. The plant support stake of claim 1 wherein:
   said adhesive comprises contact cement.

* * * * *